(12) United States Patent
Naoi et al.

(10) Patent No.: US 8,644,003 B2
(45) Date of Patent: Feb. 4, 2014

(54) ELECTROLYTIC CAPACITOR ELEMENT AND PROCESS FOR PRODUCING THE SAME

(75) Inventors: Katsuhiko Naoi, Fuchu (JP); Kenji Machida, Fuchu (JP)

(73) Assignee: National University Corporation, Tokyo University of Agriculture and Technology, Tokyo (JP)

( * ) Notice: Subject to any disclaimer, the term of this patent is extended or adjusted under 35 U.S.C. 154(b) by 653 days.

(21) Appl. No.: 11/921,922

(22) PCT Filed: Jun. 2, 2006

(86) PCT No.: PCT/JP2006/311071
§ 371 (c)(1),
(2), (4) Date: May 11, 2009

(87) PCT Pub. No.: WO2006/132141
PCT Pub. Date: Dec. 14, 2006

(65) Prior Publication Data
US 2009/0296317 A1    Dec. 3, 2009

(30) Foreign Application Priority Data
Jun. 9, 2005   (JP) .................................. 2005-169830

(51) Int. Cl.
*H01G 9/02* (2006.01)
*H01M 6/04* (2006.01)
*H01G 9/00* (2006.01)
*H01L 21/20* (2006.01)

(52) U.S. Cl.
USPC .......... 361/504; 361/505; 361/508; 29/25.03; 438/381

(58) Field of Classification Search
USPC ........... 361/504, 505, 508; 29/25.03; 438/381
See application file for complete search history.

(56) References Cited

U.S. PATENT DOCUMENTS

| | | | | |
|---|---|---|---|---|
| 4,313,084 A | * | 1/1982 | Hosokawa et al. | 323/370 |
| 4,697,224 A | * | 9/1987 | Watanabe et al. | 361/502 |
| 4,820,599 A | * | 4/1989 | Furukawa et al. | 429/333 |
| 5,077,150 A | * | 12/1991 | Yoneda | 429/162 |
| 5,085,955 A | * | 2/1992 | Cipriano | 429/329 |
| 5,322,746 A | * | 6/1994 | Wainwright | 429/60 |

(Continued)

FOREIGN PATENT DOCUMENTS

| | | |
|---|---|---|
| JP | 4-119617 | 4/1992 |
| JP | 5-159980 | 6/1993 |

(Continued)

OTHER PUBLICATIONS

Office Action issued to TW Application No. 095120068, mailed Sep. 30, 2010.

(Continued)

*Primary Examiner* — Bradley Thomas
(74) *Attorney, Agent, or Firm* — Dilworth & Barrese, LLP

(57) ABSTRACT

A process is provided for producing an electrolytic capacitor element that can uniformly form a highly electrically conductive polymer having a nano thickness level on a nano porous anode element substrate and suitable for use in high-capacitance electrolytic capacitors used in emergency power supplies and backup power supplies in electronic equipment. An oxide film and an electrically conductive polymer film are formed by pulsed constant current electrolysis of a monomer for an electrically conductive polymer and a nanoporous valve action metal in an electrolysis solution comprising an ionic liquid.

12 Claims, 3 Drawing Sheets

(56) References Cited

U.S. PATENT DOCUMENTS

| | | | |
|---|---|---|---|
| 5,362,579 A * | 11/1994 | Rossoll et al. | 429/162 |
| 5,392,191 A * | 2/1995 | Thomas et al. | 361/508 |
| 5,415,959 A * | 5/1995 | Pyszczek et al. | 429/249 |
| 5,419,977 A * | 5/1995 | Weiss et al. | 429/7 |
| 5,599,644 A * | 2/1997 | Swierbut et al. | 429/224 |
| 5,600,535 A * | 2/1997 | Jow et al. | 361/503 |
| 5,874,184 A * | 2/1999 | Takeuchi et al. | 429/314 |
| 5,902,696 A * | 5/1999 | Smesko et al. | 429/142 |
| 5,920,455 A * | 7/1999 | Shah et al. | 361/502 |
| 5,923,525 A * | 7/1999 | Belyakov et al. | 361/502 |
| 5,953,204 A * | 9/1999 | Suhara et al. | 361/502 |
| 5,961,887 A * | 10/1999 | Zheng et al. | 252/502 |
| 5,963,417 A * | 10/1999 | Anderson et al. | 361/503 |
| 5,986,876 A * | 11/1999 | Stepanov et al. | 361/502 |
| 5,986,878 A * | 11/1999 | Li et al. | 361/523 |
| 6,031,711 A * | 2/2000 | Tennent et al. | 361/303 |
| 6,036,774 A * | 3/2000 | Lieber et al. | 117/105 |
| 6,048,645 A * | 4/2000 | Saidi et al. | 429/231.95 |
| 6,097,587 A * | 8/2000 | Inagawa et al. | 361/502 |
| 6,151,205 A | 11/2000 | Kobayashi et al. | |
| 6,162,530 A * | 12/2000 | Xiao et al. | 428/292.1 |
| 6,168,694 B1 * | 1/2001 | Huang et al. | 204/290.12 |
| 6,181,546 B1 * | 1/2001 | Stepanov et al. | 361/502 |
| 6,198,623 B1 * | 3/2001 | Amatucci | 361/512 |
| 6,222,723 B1 * | 4/2001 | Razoumov et al. | 361/503 |
| 6,245,847 B1 * | 6/2001 | Green et al. | 524/418 |
| 6,343,005 B1 * | 1/2002 | Tadanobu et al. | 361/502 |
| 6,410,181 B1 * | 6/2002 | Spillman et al. | 429/101 |
| 6,414,837 B1 * | 7/2002 | Sato et al. | 361/504 |
| 6,621,684 B2 * | 9/2003 | Shimamoto et al. | 361/502 |
| 6,882,517 B2 * | 4/2005 | Tano et al. | 361/502 |
| 7,199,997 B1 * | 4/2007 | Lipka et al. | 361/502 |
| 7,316,864 B2 * | 1/2008 | Nakayama et al. | 429/217 |
| 7,567,429 B2 * | 7/2009 | Mori et al. | 361/502 |
| 7,914,704 B2 * | 3/2011 | Yamakawa et al. | 252/500 |
| 8,107,223 B2 * | 1/2012 | Lipka et al. | 361/502 |
| 2002/0034060 A1 * | 3/2002 | Konuma et al. | 361/326 |
| 2002/0039274 A1 * | 4/2002 | Konuma et al. | 361/326 |
| 2002/0097549 A1 * | 7/2002 | Maletin et al. | 361/502 |
| 2003/0118910 A1 * | 6/2003 | Carlson | 429/247 |
| 2003/0133256 A1 | 7/2003 | Yoshida et al. | |
| 2003/0141193 A1 * | 7/2003 | Hossick-Schott | 205/104 |
| 2003/0172509 A1 * | 9/2003 | Maletin et al. | 29/25.03 |
| 2004/0012913 A1 * | 1/2004 | Andelman | 361/503 |
| 2004/0106041 A1 * | 6/2004 | Reynolds et al. | 429/213 |
| 2004/0190224 A1 * | 9/2004 | Takatani et al. | 361/523 |
| 2004/0190227 A1 * | 9/2004 | Takatani et al. | 361/532 |
| 2005/0030703 A1 * | 2/2005 | Konuma et al. | 361/524 |
| 2005/0042450 A1 * | 2/2005 | Sano et al. | 428/375 |
| 2005/0195557 A1 * | 9/2005 | Hayashi et al. | 361/504 |
| 2005/0219802 A1 * | 10/2005 | Kobayashi et al. | 361/523 |
| 2005/0225930 A1 * | 10/2005 | Stieglbauer et al. | 361/523 |
| 2006/0109609 A1 * | 5/2006 | Kobayashi et al. | 361/523 |
| 2006/0120023 A1 * | 6/2006 | Kobayashi et al. | 361/523 |
| 2006/0181835 A1 * | 8/2006 | Murakami et al. | 361/503 |
| 2007/0002526 A1 * | 1/2007 | Naito | 361/523 |
| 2007/0081300 A1 * | 4/2007 | Kobayashi et al. | 361/523 |
| 2007/0146969 A1 * | 6/2007 | Naito | 361/523 |
| 2007/0206344 A1 * | 9/2007 | Naito et al. | 361/523 |
| 2007/0263341 A1 * | 11/2007 | Tsukada et al. | 361/503 |
| 2008/0003166 A1 * | 1/2008 | Maletin et al. | 423/445 R |
| 2008/0019080 A1 * | 1/2008 | Naito et al. | 361/523 |
| 2008/0158778 A1 * | 7/2008 | Lipka et al. | 361/502 |
| 2008/0165471 A1 * | 7/2008 | Kojima et al. | 361/503 |
| 2008/0304208 A1 * | 12/2008 | Murakami et al. | 361/505 |
| 2009/0027834 A1 * | 1/2009 | Naito | 361/523 |
| 2009/0290287 A1 * | 11/2009 | Lipka et al. | 361/502 |
| 2010/0085684 A1 * | 4/2010 | Suh et al. | 361/503 |
| 2010/0149729 A1 * | 6/2010 | Nishioka | 361/525 |

FOREIGN PATENT DOCUMENTS

| | | |
|---|---|---|
| JP | 11-87177 | 3/1999 |
| JP | 2001-223139 | 8/2001 |
| JP | 2001-223140 | 8/2001 |
| JP | 2003-223140 | 8/2003 |
| JP | 2003-229330 | 8/2003 |
| JP | 2003-243028 | 8/2003 |

OTHER PUBLICATIONS

Y. Ota, K. Machida, K. Naoi and M.-Niki (Graduate School of Technology, Tokyo.University of Agriculture & Technology, Matsuo Electric Co., Ltd.), "Simultaneous Electrochemical Formation of $Ta_2O_5$ / Polypyrrole Composite on Nano-Porous Ta Anode for Electrolytic Capacitors (71st Meeting of Electrochemical Society, Proceedings"), p. 279, 2004.

* cited by examiner

ELECTROLYTIC CAPACITOR ELEMENT AND PROCESS FOR PRODUCING THE SAME

TECHNICAL FIELD

The present invention relates to a process for producing an electrolytic capacitor element. More specifically, the present invention relates to a process for manufacturing an element that is preferably used in high-capacity electrolytic capacitors that can uniformly form an electrically conductive polymer with high conductivity and nano-level thickness on a nanoporous anode element substrate and are used in emergency power sources and backup power for electronic devices such as cell-phones, personal computers and digital cameras.

BACKGROUND ART

Technology for mounting with higher densities on part substrates has been progressing, with regard to electronic devices such as cell-phones, personal computers and digital cameras, along with the development of miniaturization technology with respect to surface mounting technology in recent years. In this scenario, with regard to capacitor elements of electronic parts, intensive investigation is being carried out in particular into aluminum, tantalum, and niobium electrolytic capacitors for which miniaturization and capacity enlargement are possible.

Electrolytic capacitors are configured from a large surface area nanoporous anode, an oxidized film dielectric on the anode, and a cathodic conductive layer of a conductive polymer on the dielectric. Since the capacity of electrolytic capacitors increases in proportion to dielectric area, with tantalum, for example, nanoporous tantalum or the like, having an average pore diameter of 100 nm to 500 nm, being produced by sintering nanoparticles, is used in recent years.

In conventional processes for forming electrolytic capacitor elements, a nanoporous anode is electrolytically oxidized in an aqueous electrolyte to form an oxidized film dielectric (20 nm to 200 nm). Then a manganese dioxide film, which is a preliminary conductive layer, or a conductive polymer film (100 nm to 1000 nm) is formed on the oxidized film by a chemical polymerization process. A conductive polymer film is electrolytically polymerized (1 μm to 10 μm) using the preliminary conductive layer as an anode, which is cumbersome.

In view of future increases in capacity, it is considered that nanoporous anodes having an average pore diameter of no more than 100 nm will be used; however, in cases where anode substrates having such a small pore diameter are used, it is difficult to form the conductive polymer of a cathode layer as far as the inside of the pores, with a uniform thickness, by a process of forming a preliminary conductive layer, using conventional chemical polymerization processes; thus there is a risk of a decrease in the rate of capacity development an increase in equivalent series resistance (ESR).

Therefore, as a process to form directly the conductive polymer film on the anode substrate without using the preliminary conductive layer, the present inventors have proposed a process such that an oxidized film and polypyrrole are simultaneously formed on a nanoporous tantalum anode by electrolysis using an aqueous solution containing a surfactant salt as an electrolyte (e.g. see Non-Patent Document 1, Patent Documents 1 and 2). In accordance with the process, although the polypyrrole can be formed as far as the inside of the fine pores, the polypyrrole inside the pores represents a nonuniform island-like condition. It is therefore believed that it is necessary to polymerize uniformly as far as the inside of the pores.

On the other hand, electrolysis solutions, which dissolve electrolyte salts in organic solvents, represent a problem in that the firing point is lower due to volatile organic solvents, or a problem in that long-term reliability is insufficient due to the possibility of generating liquid leakage; therefore, electrochemical devices have been investigated that use an ionic liquid, that is liquid-like at room temperature, for an ion conductor, as a material to improve these problems. In particular, an electrochemical device is proposed that exhibits excellent charge-discharge cycle behavior and a longer operating life by use of an electrolytic polymerization product of polymerizable compounds (monomers) such as pyrrole and thiophene in an ionic liquid as a conductive polymer (e.g. see Patent Document 3). However, application of conductive polymer films, prepared by use of ionic liquid electrolytes, for electrolytic capacitors has not been tried yet.

Non-Patent Document 1: 71st Meeting of Electrochemical Society, Proceedings p. 279 (2004)
Patent Document 1: Japanese Unexamined Patent Application Publication No. 2001-223139
Patent Document 2: Japanese Unexamined Patent Application Publication No. 2001-223140
Patent Document 3: Japanese Unexamined Patent Application Publication No. 2003-243028

SUMMARY OF THE INVENTION

DISCLOSURE OF THE INVENTION

Problems to be Solved by the Invention

The present invention has been made in view of the current conditions described above; it is an object of the present invention to provide a process for producing an electrolytic capacitor element, in which a conductive polymer such as polypyrrole, polypyrrole derivatives and polythiophene derivatives is uniformly formed on an oxidized film formed on a valve metal porous anode such as of aluminum, tantalum and niobium or on a preliminary conductive layer, such as of manganese dioxide and chemical polymerization conductive polymers, formed on the oxidized film.

Means for Solving the Problems

The gist of the present invention is a process for producing an electrolytic capacitor element, in which the process comprises electrolyzing by a pulse constant current a conductive polymer monomer and a nanoporous valve action metal in an electrolyte of an ionic liquid, and forming an oxidized film and a conductive polymer film.

In processes that use conventional liquids as an electrolyte, it is difficult to form a conductive polymer on substrates having pores of no more than 100 nm; in contrast, when a conductive polymer is formed on nanoporous anodes by pulse electrolysis processes within an ionic liquid electrolyte, a conductive polymer film is formed uniformly as far as the inside of the pores of nanoporous substrates, and electrolytic capacitor elements can be produced with a higher capacity development ratio and a lower ESR.

Effects of the Invention

In accordance with the present invention, a conductive polymer can be formed with a high conductivity and a uniform thickness at a nano level on substrates of a nanoporous anode element; and the elements can be provided that are preferably used for high capacity electrolytic capacitors that are used for emergency power sources or backup power in electronics devices such as cell-phones, personal computers and digital cameras. Application to converters or inverters of electronic control portions of electric cars or fuel cell cars also holds promise.

DESCRIPTION OF THE PREFERRED EMBODIMENTS

Figure 1:
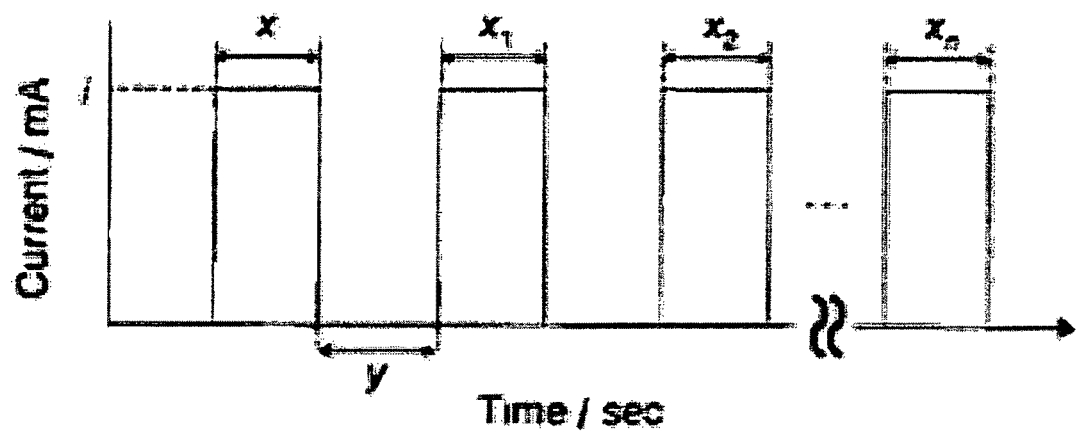
FIG. 1 is a schematic view that shows parameters in a process by a pulse constant current.

The present invention will be explained in detail below. An ionic liquid is used as the electrolyte in the present invention. The ionic liquid in the present invention means an organic salt that is formed exclusively from a cation and an anion, bonded by an electrostatic attracting force, and is a liquid at normal temperature. More specifically, the ionic liquid is a molten salt at room temperature having an onium cation and is normally a liquid within a range of −40° C. to 100° C. As such, the ionic liquid exhibits a very wide temperature range in which it maintains a liquid state, and has properties of non-volatility, flame resistance, conductivity, heat resistance, low viscosity, etc.

Preferable examples of the onium cation are ammonium cations and heterocyclic onium cations. Examples of the ammonium cations include aliphatic quaternary ammonium ions such as trimethylpropyl ammonium ion, trimethylhexylyl ammonium ion, tetrapentyl ammonium ion and diethyltrimethyl(2-methoxy)ethyl ammonium ion, and alicyclic quaternary ammonium ions such as N-butyl-N-methylpyrrolidinium ion.

Examples of the heterocyclic onium cations include imidazolium cations, pyridinium cations, etc. Specific examples of the imidazolium cations are dialkylimidazolium cations such as 1,3-ethylmethylimidazolium, 1-ethyl-3-methylimidazolium ion and 1-propyl-3-methylimidazolium ion and trialkylimidazolium cations such as 1,2,3-trimethylimidazolium ion and 1,2-dimethyl-3-propylimidazolium ion.

The pyridinium cations are exemplified by N-propylpyridinium ion, N-butylpyridinium ion, 1-butyl-4-methylpyridinium ion and 1-butyl-2,4-dimethylpyridinium ion.

On the other hand, the anion that constitutes the ionic liquid is exemplified by sulfonic acid anions having a perfluoroalkyl group, specifically, trifluoroalkylsulfonic acid anions ($C_nF_{n+1}SO_3^-$, n=1 to 12), and imide anions, specifically, bisperfluoroethane sulfonimide (BET), etc. Preferable are boron tetrafluoride anion ($BF_4^-$), phosphorus fluoride anion ($PF_6^-$), and perfluoro methanesulfonyl imide (TFSI).

Preferable properties required for the ionic liquid include (i) being capable of dissolving conductive polymer monomers, (ii) having somewhat higher ion conductivity, (iii) having no excessively high viscosity, (iv) being electrochemically stable, and (v) being thermally stable. Therefore, among the cations and the anions described above, ammonium cations, and boron tetrafluoride anion and perfluoro methanesulfonyl imide are preferably used.

In the present invention, a conductive polymer monomer and a nanoporous valve action metal are electrolyzed by a pulse constant current in the electrolyte consisting of the ionic liquid as described above (hereinafter referred to as "ionic liquid electrolyte") thereby to form an oxidized film and a conductive polymer film. The conductive polymer film may be obtained by electrolytically polymerizing a conductive polymer monomer within an ionic liquid electrolyte by constant a potential process or a constant current process using a pulse. The electrolysis by the pulse constant current may be carried out separately to form the oxidized film and to form the conductive polymer film; it is preferable that formation be done simultaneously through the electrolysis by the pulse constant current in the presence of the conductive monomer polymer, since the conductive polymer film may be formed uniformly as far as the inside of the pores.

The conductive polymer monomer is exemplified by monomers having a pyrrole skeleton and monomers having a thiophene skeleton. Specific examples include pyrrole, thiophene, 3,4-ethylene dioxythiophene, 3-alkylthiophene ($C_4H_3S$—$C_nH_{n+1}$, n=1 to 12). The nanoporous valve action metal to form the oxidized film is exemplified by aluminum, tantalum, niobium, tungsten, hafnium, bismuth, titanium, zirconium, silicon, antimony, etc. and nanoporous bodies of alloys of these two or more metals.

The nanoporous body is a structure having pores of which the pore diameter is 0.5 nm to 1000 nm; examples thereof are aluminum foil having pores of 1 nm to 500 nm obtained by an etching treatment, pellet materials obtained by sintering and rolling tantalum or niobium particles having a particle diameter of 50 nm to 300 nm, etc. Tantalum pellets may be produced in accordance with the following process. Initially, tantalum potassium fluoride is reduced to prepare a tantalum powder, then the powder and a binder are mixed and press-sintered thereby to form a pellet. There exist commercially available products; Cabot Co., Kojundo Material Laboratory Co., and Stark Vtec Co. commercially provide them.

In the production process according to the present invention, the conductive polymer monomer and the nanoporous valve action metal are electrolyzed under a pulse constant current within an ionic liquid electrolyte. The electrolysis process under a pulse constant current is exemplified by a constant current electrolysis such as a valve action metal used as an anode, an ionic liquid is used as an electrolyte, current i is set to be 1 μA to 100 mA, pulse width is set to be 1 sec to 1000 sec, relaxation time is set to be 1 sec to 1000 sec, and pulse number is set to be 1 to 1000.

The resulting oxidized film is the nanoporous valve action metal or divalent to pentavalent oxides formed on alloys of these two or more metals. The film thickness of the oxidized film is proportional to the charge amount therethrough, and grows to about 10 nm to 200 nm. The density is about 1.5 g/cm$^3$ to 8 g/cm$^3$, and it forms relatively densely on a metal. Voltage increases accompanying this. The resulting oxidized film has a dielectric property, and the specific permittivity is relatively broad such as 7 to 55.

The resulting conductive polymer film is formed from polymerizing the conductive polymer monomer described above. The film thickness grows to about 50 nm to 100 μm depending on the parameters of monomer concentration, polymerizing temperature, and conducted charge amount. The density is about 0.5 g/cm$^3$ to 1.5 g/cm$^3$, and a relatively porous structure grows on the oxide. The electric conductivity is about 0.1 S/cm to 200 S/cm. The higher the electric conductivity, the more the capacitor properties (ESR, frequency characteristic, etc.) are enhanced.

In the electrolytic capacitor element according to the present invention, the film thickness ratio of the total film thickness of the oxidized film formed on the surface of the element substrate and the conductive polymer film, to the total film thickness of the oxidized film formed inside the nanoporous and the conductive polymer film, is preferably 1 to 10. That is, in the conventional aqueous electrolyte systems, the total film thickness at the surface of element substrates is very thick compared to the total film thickness inside nanoporous, and thus the film is dominantly formed on the surface; meanwhile the film is formed in a uniform thickness as far as the inside of nanoporous.

The electrolytic capacitor element according to the present invention may contain a preliminary conductive layer. The preliminary conductive layer is formed by conventional processes. That is, a nanoporous valve action metal, to which the treatment to form a preliminary conductive layer is applied, may be electrolyzed under a pulse constant current within an electrolyte of an ionic liquid containing a conductive polymer.

In the electrolytic capacitor device, produced in accordance with the present invention, the conductive polymer of the cathode conductive layer exhibits a higher electric conductivity and is formed uniformly and faithfully on the valve action metal having a nanoporous structure and the oxidized film, so that the property of lower ESR can be obtained. The ESR is of mΩ order at 100 kHz in an example described later, which is a very low value for a laboratory level capacitor sample. As can be realized from the observation results of SEM images described later, a higher capacity development ratio (capacitance/theoretical capacitance) can be taken since the conductive polymer is formed densely and faithfully on the oxidized film. The sample capacitance in the examples described later exhibits a very high capacity appearance rate such as 98%.

EXAMPLES

The present invention will be explained in more detail with reference to examples, but the present invention should not be limited to the examples below as long as being within the gist.

Example 1

An ionic liquid (1,3-ethylmethylimidazolium boron tetrafluoride (hereinafter referred to as $EMIBF_4$), dissolving 3M of pyrrole, was poured into a glass cell, to which an anode (nanoporous substrate: (50,000 µFV/g) (4,000 cm$^2$/g)) and a cathode (platinum wire) were immersed, then electrolysis by a pulse constant current was carried out under the conditions of current i=0.1 A to 10 A, pulse width x=42 sec to 420 sec, relaxation period y=10 sec to 2700 sec and pulse number n=1 to 500 times, using a potentiostat and a control device. These parameters are illustratively shown in FIG. 1. After the electrolysis, rinsing was carried out several times using ethanol to obtain an anode element sample.

Figure 2:
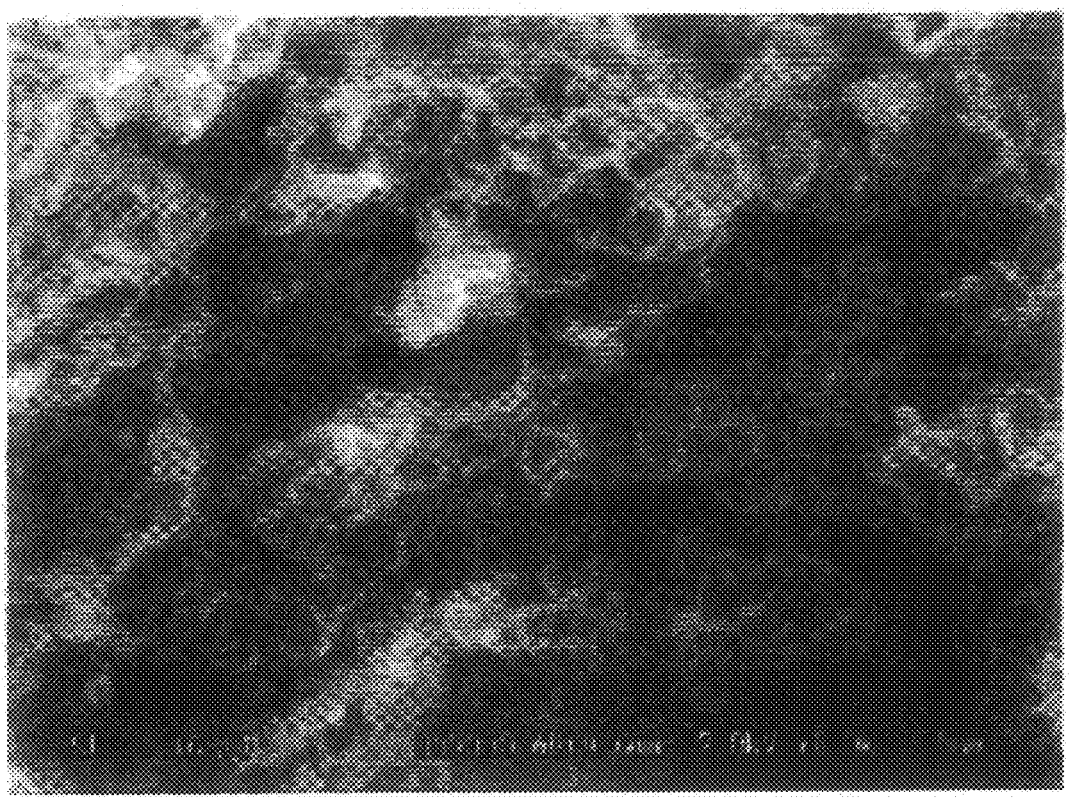
FIG. 2 is a photograph that shows a SEM image of a sample obtained in Example 1.

The cross section of the resulting sample was observed by a scanning electron microscope (SEM), and it was found that polypyrrole was uniformly and densely formed on the surface of nanoporous tantalum surface as well as inside the pores (see FIG. 2) compared to conventional constant current processes (no pulse).

Comparative Example 1

An anode element sample was obtained in the same manner as Example 1 except that an aqueous solution of 0.1 M of dodecylbenzene sodium sulfonate (SDBS) dissolving 1M of pyrrole was used in place of the ionic liquid dissolving 3M of pyrrole.

The results of approximate calculation for the film thickness of polypyrrole film were shown in Table 1 with respect to the anode element samples obtained in Example 1 and Comparative Example 1 (film thickness on surface: $d_{sur}$, film thickness inside pores: $d_{inn}$).

TABLE 1

|  | $d_{sur}$/nm | $d_{inn}$/nm |
| --- | --- | --- |
| SDBS electrolyte | 3000 | 230 |
| $EMIBF_4$ electrolyte | 240 | 240 |

The results of Table 1 demonstrate that the film thickness of $d_{sur}$ is very large compared to that of $d_{inn}$ and thus polypyrrole is formed dominantly on the surface in the conventional aqueous electrolyte systems; meanwhile when the ionic liquid electrolyte is used, the film thicknesses of $d_{inn}$ and $d_{sur}$ are equivalent and thus the film is formed in a uniform thickness as far as the inside of the pores of tantalum anode.

The first reason why the uniform and highly dense polypyrrole film is formed on the substrate within $EMIBF_4$ is cited to be high viscosity of $EMIBF_4$. That is, the generation of polypyrrole nuclei on substrates initiates typically when an oligomer becomes insoluble and deposits on substrates. At the same time, the oligomer diffuses or migrates toward a bulk side, and it is believed that the diffusion and migration of the oligomer is unlikely to occur in the viscous $EMIBF_4$, thus the oligomer remains at the interface of electrodes. It is hence believed that the polypyrrole nuclei generate entirely and uniformly on the substrates and the uniform and highly dense polypyrrole film is obtained on the substrates.

The second reason is cited to be the difference in generating the polypyrrole nuclei due to the difference of the structure of electric double layer at the interface. In usual electrolytes, consisting of a solvent, a supporting electrolyte and a monomer, a fixed layer (inner Helmholtz layer), consisting of a solvent molecule, a specifically adsorbed anion that exists partially and a neutral molecule (monomer molecule) is formed at the interface of electrodes and electrolytes. Then a diffusion layer is formed from a cation and a solvent molecule, and a neutral molecule and an anion. On the other hand, it is believed that the electrolyte, consisting exclusively of an ionic liquid and a monomer, contains no solvent; therefore, a fixed layer is formed from a monomer adsorbing layer, an anion and a cation. That is, the monomer is considered to be fixed to the surface of substrate before electrolysis. It is believed that when a constant current is applied to electrodes in this condition, the monomer, fixed at the interface of electrodes, is oxidized to form an oligomer and to form nuclei. It is said that nuclei generate uniformly on substrates even in cases of nanoporous electrode substrates since the monomer is fixed in a molecular level. It is believed that this nucleus formation may result in a uniform and highly dense polypyrrole film on substrates.

Figure 3:
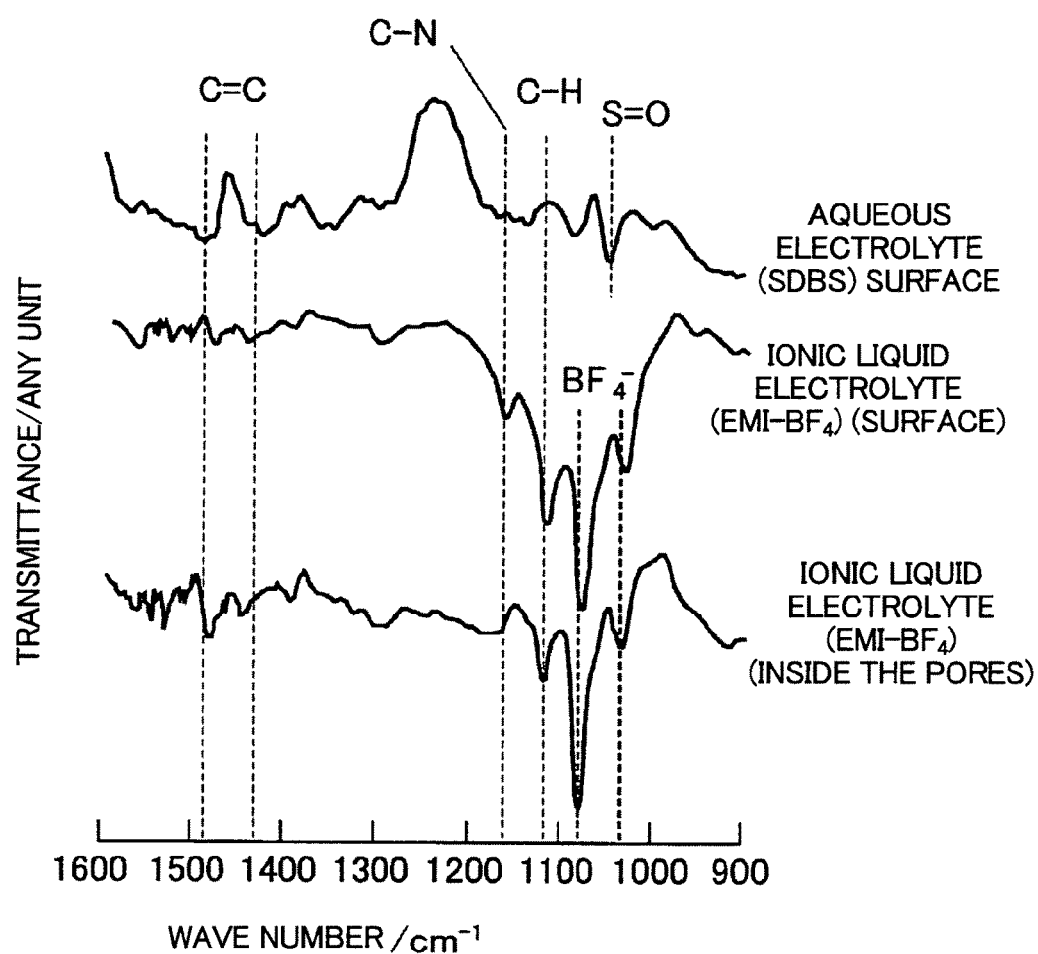
FIG. 3 is a view of FTIR spectra obtained in Example 1.

These infrared absorption spectra are shown in FIG. 3. It is said, as shown in FIG. 3, that the polypyrrole film, obtained by the pulse process within the ionic liquid, represents an electrically active (conductive) polymer structure similarly as the conventional constant current processes within aqueous electrolyte and has a high electrical conductivity.

Next, the surface resistance of the polypyrrole, formed on the nanoporous tantalum anode, was evaluated. Specifically, the resistance of polypyrrole film deposited on the pellet surface ($R_{surf}$) and the resistance of polypyrrole film deposited inside the pores ($R_{inn}$) were measured. The results of measurement are shown in Table 2.

TABLE 2

| | $R_{surf}/\Omega sq^{-1}$ | $R_{inn}/\Omega sq^{-1}$ |
|---|---|---|
| SDBS electrolyte | $1 \times 10^{-1}$ | $2 \times 10^{-1}$ |
| EMIBF$_4$ electrolyte | $2 \times 10^{-2}$ | $2 \times 10^{-2}$ |

As shown in Table 2, the polypyrrole film obtained within the ionic liquid represents surface resistance values, which were about one-order small relative to those of the polypyrrole film obtained in SDBS systems, with respect to both the resistance value ($R_{surf}$) of the film deposited at the surface portion of the nanoporous tantalum and the resistance value ($R_{inn}$) of the film deposited at the central portion of pores. It is suggested from this fact that the polypyrrole film, obtained within the ionic liquid, has a high electric conductivity.

When the application for electrolytic capacitors is considered, it is an essential condition that the polypyrrole for cathodic conductive layer has a high electric conductivity for the purpose of decreasing equivalent series resistance (ESR) and enhancing high-frequency properties. Accordingly, it is said that the polypyrrole film obtained in EMIBF$_4$ and having a low surface resistance value, i.e. the polypyrrole film with a high electric conductivity, is suited to the cathodic conductive layer of electrolytic capacitors. It is believed that the electric conductivity affects film morphology, film density, etc. when considered from a macro point of view. It is suggested that the polypyrrole film, formed within EMIBF$_4$, is flat and highly dense from SEM observation as well as the evaluation of film thickness, which is believed to be a factor to generate the higher electric conductivity.

When considering factors of electric conductivity in molecular level, it is believed to depend on polymerization degree, degree of branching ($\alpha$-$\beta$ coupling), species of dopant anion, etc. It has been confirmed from the analysis of FTIR spectra shown in FIG. 3 that the inclusion of BF$_4^-$ anion into polypyrrole film is very large. It is therefore considered that the polypyrrole film, formed within EMIBF$_4$, possibly has a large doping rate, i.e. the polymerization degree will be high, which is also considered to be one factor of higher conductivity. In the electrolysis polymerization of polypyrrole where water or acetonitrile is used as a solvent, a water molecule or an acetonitrile molecule, having a lone electron pair, adds nucleophilically to $\alpha$-site of the terminal of polypyrrole, which acts as a termination reaction of polymer growth and the growth stops at a degree of molecular weight (Mw=60,000). In contrast to this, EMI, having a nitrogen atom with a lone electron pair, is unlikely to add nucleophilically due to its cationization within EMIBF$_4$, furthermore, and only fluorine-stabilized BF$_4^-$ anions exists as other molecules. It is therefore believed that the nucleophilic reaction is unlikely to occur within EMIBF$_4$, as a result, the polymerization degree is higher and the electric conductivity increased.

Example 2

A carbon paste was coated on an anode element sample and dried, in which the anode element sample was obtained in the same manner as Example 1 except that a nanoporous tantalum anodized at 10 V in sulfuric acid aqueous solution was used. Subsequently, an Ag paste was coated and dried to connect a Cu terminal to prepare an electrolytic capacitor sample. The AC impedance of the sample was measured and the capacity appearance rate was evaluated at 120 Hz to be as high as 98% although the rate was 30% in SDBS systems. In addition, ESR at 100 kHz had a low resistance of 500 m$\Omega$.

INDUSTRIAL APPLICABILITY

Electrolytic capacitor elements, having a higher capacity development rate and a lower ESR, can be produced by usage of the anode element according to the present invention, so that it can be said that the present invention is excellent as a process for producing an electrolytic capacitor element. It is believed that the present invention is useful as a process for producing an aluminum electrolytic capacitor, a niobium capacitor, etc. in addition to the tantalum electrolytic capacitor.

The invention claimed is:

1. A process for simultaneously producing in a single step a nanoporous valve action metal anode having a nanoporous structure throughout the anode with an oxidized film and a conductive polymer film on the oxidized film, the process comprising:
    simultaneously electrolyzing by a pulse constant current, a conductive polymer monomer and the nanoporous valve action metal anode having a nanoporous metal structure throughout the anode including pores dispersed throughout the anode with a pore diameter of 0.5 nm to 1000 nm in an ionic liquid electrolyte in the absence of solvent to form the oxidized film on the anode as an oxidized dielectric and the conductive polymer film on the oxidized film having a uniform thickness as far as the inside of the pores of the nanoporous valve action metal anode.

2. The process according to claim 1, wherein the ionic liquid electrolyte contains at least one of ammonium cations and heterocyclic onium cations.

3. The process according to claim 1, wherein the ionic liquid electrolyte contains at least an anion selected from the group consisting of boron tetrafluoride anion, phosphorus fluoride anion and perfluoro methanesulfonylimide.

4. The process according to claim 1, wherein
    the ionic liquid electrolyte consisting exclusively of an organic salt formed exclusively from a cation and an anion and bonded by an electrostatic attracting force, and
    the conductive polymer monomer contains no solvent, and therefore a fixed layer is formed from the conductive polymer monomer, the anion and the cation on the surface of the nanoporous valve action metal, and
    when constant current is applied to the anode in this condition, the conductive polymer monomer, fixed at the surface of the anode, is oxidized to form an oligomer and nuclei generating uniformly on the nanoporous valve action metal anode and resulting in uniform and highly dense conductive polymer film on the oxidized film of the anode.

5. The process according to claim 4, wherein the conductive polymer film is polypyrrole film.

6. The process according to claim 1, wherein the conductive polymer monomer is selected from the group consisting of at least one of a monomer having a pyrrole skeleton and a monomer having a thiophene skeleton.

7. The process according to claim 1, wherein the nanoporous valve action metal anode is selected from the group consisting of tantalum, aluminum and niobium.

8. The process according to claim 1, wherein the electrolysis by a pulse constant current is carried out under a condition of a current value of 1 $\mu$A to 100 mA, a pulse width of 1 sec to 1000 sec, a relaxation time of 1 sec to 1000 sec and a pulse number of 1 to 1000.

9. The process according to claim 1, wherein the oxidized film and the conductive polymer film are formed simultaneously.

10. The process according to claim 1, the process consisting of only the step of:
   simultaneously electrolyzing by a pulse constant current, a conductive polymer monomer and the nanoporous valve action metal anode having a nanoporous metal structure throughout the anode including pores dispersed throughout the anode with a pore diameter of 0.5 nm to 1000 nm in an ionic liquid electrolyte in the absence of solvent to form the oxidized film on the anode as an oxidized dielectric and the conductive polymer film on the oxidized film having a uniform thickness as far as the inside of the pores of the nanoporous valve action metal anode.

11. A process for simultaneously producing in a single step a nanoporous valve action metal anode having a nanoporous structure throughout the anode with an oxidized film and a conductive polymer film on the oxidized film, the process comprising:
   electrolyzing by a pulse constant current the nanoporous valve action metal anode having a nanoporous metal structure throughout the anode including pores dispersed throughout the anode, on which preliminary conductive layer formation treatment is carried out in an electrolyte of an ionic liquid in the absence of solvent and a conductive polymer monomer to simultaneously form the oxidized film on the anode and the conductive polymer film on the oxidized film having a uniform thickness as far as the inside of the pores having a pore diameter of 0.5 nm to 1000 nm of the nanoporous valve action metal anode.

12. The process according to claim 11, wherein the ionic liquid electrolyte contains at least an anion selected from the group consisting of boron tetrafluoride anion, phosphorus fluoride anion and perfluoro methanesulfonylimide.

* * * * *